May 31, 1960
V. E. MATULAITIS
2,939,065
TRANSISTORIZED POWER FEED
Filed Dec. 3, 1958
2 Sheets-Sheet 1
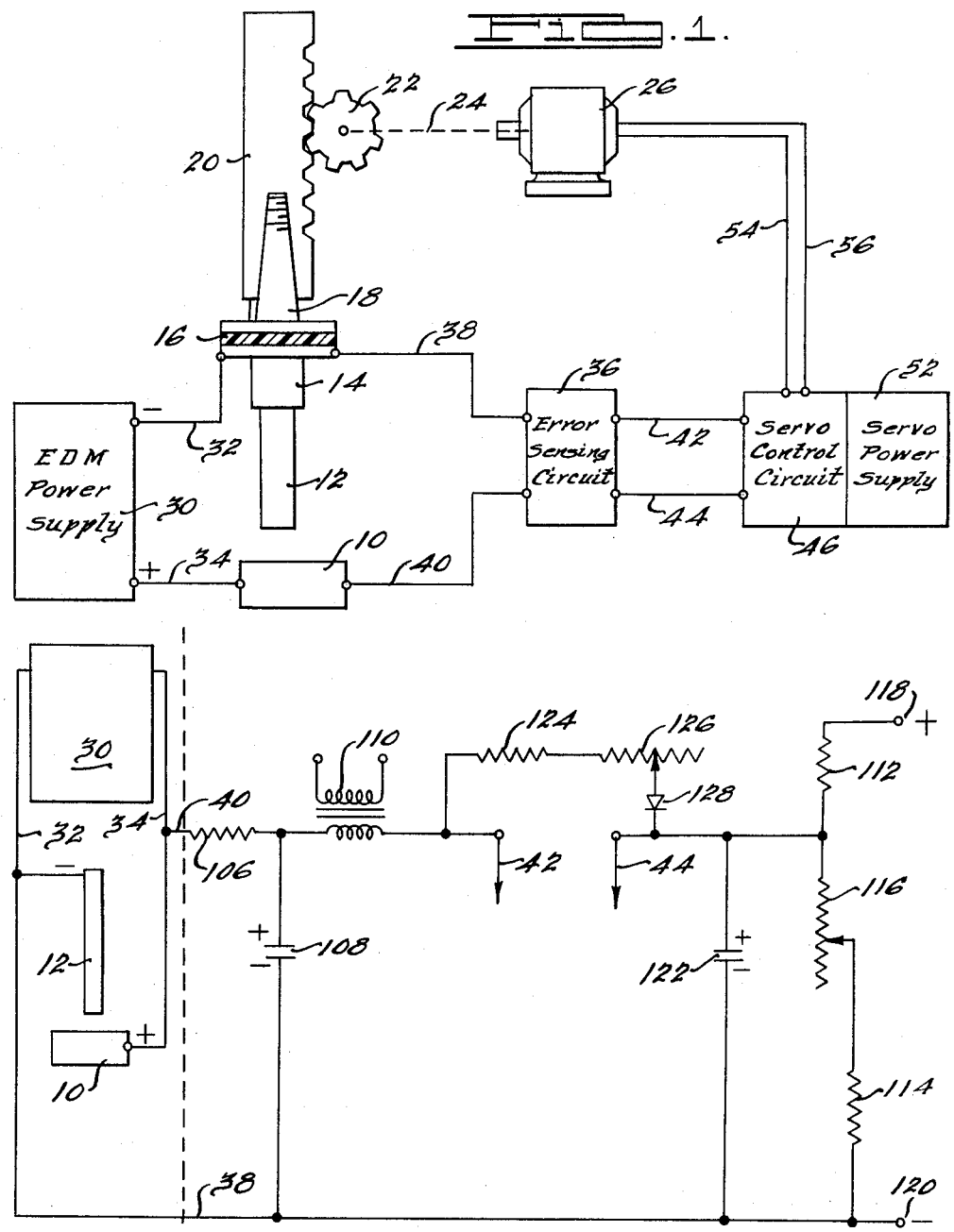
INVENTOR.
Victor E. Matulaitis.
BY
ATTORNEY.

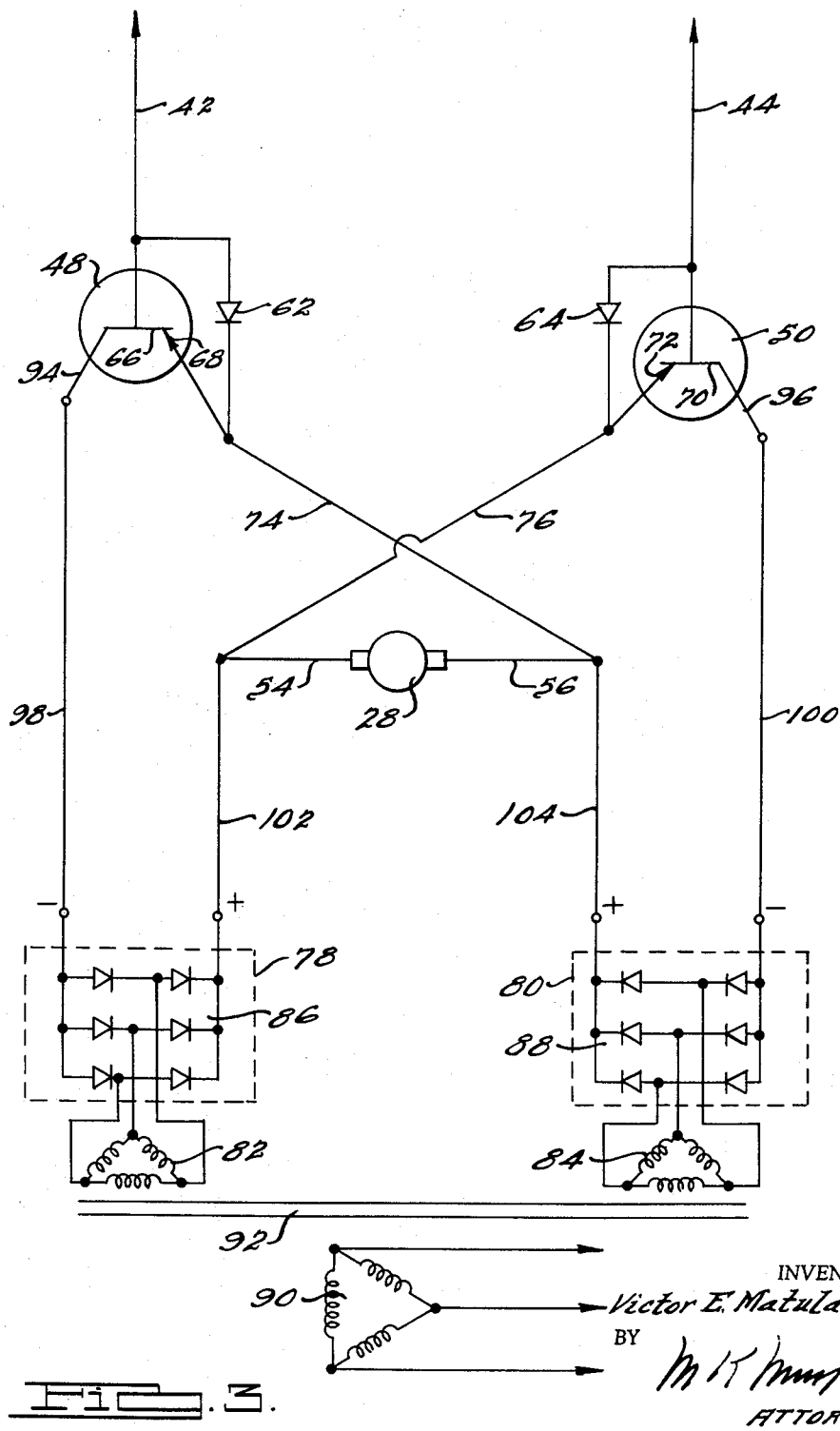

2,939,065
TRANSISTORIZED POWER FEED

Victor E. Matulaitis, Franklin, Mich., assignor to Elox Corporation of Michigan, Clawson, Mich., a corporation of Michigan Filed Dec. 3, 1958, Ser. No. 777,927

6 Claims. (Cl. 318—293)

This invention relates to improved electrical servo-motor control apparatus, and particularly servo-motor mechanism for use with the power feed systems of electrical discharge machining equipment.

Electrical-discharge-machining, sometimes referred to as EDM, comprises the disposing of a cutting electrode of selected cross-sectional configuration in proximate relation to a workpiece in the presence of dielectric coolant and causing a series of high frequency, short duration, spark initiated, electrical discharges, to pass from the electrode to the workpiece for eroding the same.

In the operation of the EDM process, it is extremely important that the electrode be maintained at preselected optimum gap distance from the workpiece, that the electrode be fed into the work as material is removed, and that the electrode instantly be withdrawn in event of a short circuit such as may occur when the electrode accidentally contacts the work due to overfeed or eroded particles pile up in the gap zone.

Various systems of automatic power feed and regulation of the electrode are in use in the art. These systems are expensive, bulky in construction, relatively slow in response to changes in gap spacing, require excessively large amounts of power for operation and have excessive backlash or overrun in operation.

Accordingly it is the object of my invention to provide an automatic power feed and regulator for EDM apparatus which substantially, if not completely, avoids the aforesaid objections.

Another object is to provide an improved control system for electrode power feeds which is more compact in form and more economical in construction and operation than those now in use, and which substitutes transistors for vacuum tubes.

Still another object is to provide a simplified servo-motor control circuit of the polarized, reversible, direct current type, wherein a reversible or polarized D.C. voltage of relatively high power is applied to the armature of an electric motor and is controlled by a relatively weak error signal.

A further object is to provide improved means for selective control of direct current loads which are either voltage or current polarized and which require significant amounts of power for operation, such as, for example, polarized relays, hydraulic valves, etc., where the control signal is relatively weak.

An additional object is to provide an amplifying D.C. servo-control circuit which comprises in its entirety, two like polarity transistors, two rectifiers and a suitable source of power.

Other objects and advantages will be apparent from the following description.

In the accompanying drawings, I have shown, in schematic form, a preferred embodiment of my invention.

Fig. 1 is a schematic block diagram which shows the relationship between the various basic components of my improved power feed when applied to electrical discharge machining equipment;

Fig. 2 is a schematic circuit diagram of the error sensing circuit; and

Fig. 3 is a schematic circuit diagram of the servo-motor control.

Referring now to Fig. 1, it will be seen that the workpiece 10 to be machined is disposed adjacent the cutting electrode 12 of desired cross-sectional form. The electrode or tool 12 is held in a collet 14 which is mechanically secured to a support member 18, an insulator 16 being interposed to electrically isolate the tool from feed mechanism proper.

The tool support is mounted in a quill 20 which is provided with rack teeth engaged by a pinion 22, the latter being reversibly driven by an electric motor 26 through suitable drive means 24 which will usually include a speed-reducing gear train. This mechanism is common in the machine tool art and is shown in simplified diagrammatic form; and other conventional units which are standard in a complete electrical discharge machining set-up, such as filters for the coolant, pumps to assure an adequate supply of dielectric fluid flow in the gap zone, etc., have been omitted in the interest of simplicity inasmuch as these units are well known and have no bearing on the invention being described.

An EDM power supply 30 has its negative side connected to the tool holder 14 by lead 32 and its positive side to the workpiece 10 by lead 34. The power supply is preferably of the D.C. pulsing type and may be of any suitable design. Reference is made to my co-pending applications Serial No. 669,803 and Serial No. 702,283, and to my issued Patent No. 2,804,575, for examples of power supplies suitable for use with the present invention.

The motor 26 is provided with a conventional field and a reversible armature 28 (Fig. 3), and it is the armature that is controlled to provide optimum positioning and feed of the tool 12.

The power supply 52 for motor 26 and the control circuit 46 which controls the application of operating power to the motor are shown in detail in Fig. 3. The servo control circuit 46 functions in response to signals received from the sensing circuit 36, which is shown in detail in Fig. 2 and which, during the machining operation, constantly monitors conditions existing in the gap between the electrode 12 and work 10. In the presently described apparatus, the sensing circuit 36 monitors and is sensitive to changes in the average voltage existing across the gap.

Conductors 38 and 40 (Figs. 1 and 2) connect the sensing circuit 36 across the gap and any deviation of "error" in average gap voltage from the voltage preselected at the start of the machining operation, causes a signal to be transmitted through leads 42, 44, to the control component 46 which instantly causes transmission of power from the power supply 52 through leads 54, 56, to energize armature 28 of motor 26 for rotation in the required direction to re-establish the proper gap condition.

Referring now to Fig. 3 which shows the combined circuitry of components 46 and 52, it will be seen that the control circuit includes a "backup" transistor 48 and a "downfeed" transistor 50. A diode 62 is connected between base 66 and emitter 68 of transistor 48, and a diode 64 is connected between base 70 and emitter 72 of transistor 50. The diodes will conduct or pass current from the bases to the emitters and, conversely, will block passage of current from the emitters to the bases.

The emitters 68 and 72 are connected with the motor armature 28 by leads 74, 76. Conductors 42, 44, constitute the input to the control circuit and are connected respectively to the transistor bases 66 and 70.

A pair of electrically isolated power supplies 78, 80, furnish the power to drive armature 28. In the present disclosure, these power supplies are identical and comprise respectively three-phase transformer secondaries 82, 84, which feed rectifier banks 86, 88. A three-phase primary 90 is coupled to the secondaries 82, 84, through a core 92, and is supplied by a three-phase power line. A battery, generator or other type of power supply may be used if desired.

The negative terminals of the power supplies are connected with the transistor collectors 94, 96, by leads 98, 100. The positive terminals are connected with the armature 28 by leads 102, 104. While the transistors 48 and 50 are shown as of the pnp type, a pair of npn type transistors could be used with equally good results, in which case the polarities in the circuit would be changed accordingly.

As so far described, operation of the servo circuit is as follows:

Let it be assumed that conductor 44 is "grounded" or is held at some selected fixed potential and that conductor 42 may be made positive or negative in potential with respect to 44.

If 42 be at relatively positive potential, current will flow in the following path: From conductor 42 through diode 62, conductors 74 and 56 to armature 28, then through conductors 54 and 76, emitter 72 and base 70 to conductor 44. In accordance with known phenomena, the flow of low intensity current in the base electrode 70 of transistor 50 will cause an amplified current flow in the emitter-collector circuit 72–96, lead 100, power supply 80 (minus to positive), leads 104, 56, armature 28, and leads 54, 76.

In brief, the voltage across armature 28 will be lower than the voltage between input leads 42–44 by the relatively negligible voltage drop in diode 62 and in the emitter-base circuit 70–72, while the ratio of "control" and "power" currents will be substantially equal to the current amplification ratio of transistor 50.

It will be noted that the control and power circuits have a common path through the armature 28 and emitter 72. This type of circuit because of its grounded collector arrangement is stable, possesses a high degree of D.C. feedback and is relatively insensitive to changes in circuit parameters, temperature and transistor characteristics.

When conductor 42 is made negative with respect to 44, control current follows the path through 44, diode 64, leads 76, 54, armature 28, leads 56, 74, emitter 68, base 66 and lead 42, and the power current flow is through emitter 68, collector 94, power supply 78 (minus to positive), leads 102, 54, armature 28, and leads 56 and 74. As above, parameters 54, 56 and 68, are common to both control and power circuits.

While any one of several error sensing circuits 36 may be employed to couple the servo control circuit to the motor 26, I prefer the circuit shown in Fig. 2.

Resistor 106 and condenser 108 function as an integrating network to produce an average of gap voltage across the condenser. The transformer 110 provides an A.C. "dither" or "jitter" voltage which is superimposed on the line and tends to eliminate or reduce null point friction on the armature 28.

Resistors 112 and 114 and potentiometer 116 are connected across a source of D.C. voltage 118, 120, and provide a variable reference voltage across a condenser 122. Resistor 124, rheostat 126 and rectifier 128 are connected in series and in shunt across the servo control input leads 42, 44, to provide means for modifying the control characteristic. Condensers 108 and 122 provide desirable filtering action and, in addition, function as anti-hunting devices when abrupt changes in gap voltage occurs.

Typical values for the components of the sensing circuit are as follows: resistor 106, 300 ohms; condenser 108, 20 mfd.; secondary of transformer 110, 6.3 volts; resistor 124, 100 ohms; resistor 126, 1000 ohms; condenser 122, 40 mfd.; resistor 112, 4700 ohms; resistor 114, 1500 ohms; potentiometer resistor 116, 10,000 ohms; voltage source 118, 120, 40 volts.

It will be understood from the above description that the operator of the electrical-discharge-machining apparatus may select an operating reference voltage for a particular job by adjustment of the potentiometer 116. The other adjustments having to do with gap voltage supply, coolant pressure, etc., having been made, the apparatus is ready for automatic cutting when the main power supply is switched on.

The electrode 12 will advance or downfeed toward the workpiece 10 until it reaches a position such that the voltage across the working gap will cause breakdown of the dielectric in the gap and intermittent discharge will occur in accordance with well known EDM operating procedure. Advance of the electrode 12 will cease when the gap voltage, as averaged across the condenser 108, equals the voltage across condenser 122, the opposed voltages on leads 42 and 44 being balanced.

Erosion of the workpiece 10 will lengthen the gap and cause a rise in voltage across condenser 108 whereupon lead 42 will be rendered positive with respect to lead 44. This will cause transistor 50 to conduct and apply a positive current flow from power source 80 to armature 28 which, in turn, causes rotation of armature 28 to advance the electrode to again balance the gap voltage with the reference voltage.

Should the gap average voltage fall in magnitude because of a short circuit, a partial short or for other reason, the voltage on condenser 122 will be greater than that on condenser 108 and the transistor 48 will be rendered conductive, thus causing rotation of the armature in the opposite or retracting direction.

It will thus be seen that I have provided a simple, transistor controlled, servo-control for feeding and for maintaining optimum tool position, and one which is especially advantageous in that it permits use of like polarity transistors with consequent saving in cost and improvement in circuit stability.

I claim:

1. In combination with a reversible electrically actuated servo-motor for controlling the position of a movable tool, an error sensing circuit for monitoring position of the tool including means for emitting a signal in response to deviation of tool position from preselected programmed movement thereof, a pair of voltage sources, means connecting said voltage sources to the armature of said motor in polarity opposed relation, said means comprising a pair of like polarity transistors having their base electrodes connected to the output of said error sensing circuit and their respective collector-emitter electrodes connected in series with said armature and said respective voltage sources, and a one-way current conducting device connected between the base and emitter leads of each transistor.

2. In combination with a reversible electrically actuated servo-motor for controlling the position of a movable tool, an error sensing circuit for monitoring position of the tool including means for emitting a signal in response to deviation of tool position from preselected programmed movement thereof, a pair of voltage sources, means connecting said voltage sources to the armature of said motor in polarity opposed relation, said means comprising a pair of transistors of like polarity having their base electrodes connected to the output of said error sensing circuit and their respective collector-emitter electrodes connected in series with said armature and said respective voltage sources, and a one-way current conducting device connected between the base and emitter leads of each transistor in such relationship that current may flow in direction opposite that of normal base-emitter conduction of said respective transistors.

3. In combination with a reversible electrically actuated servo-motor for controlling the position of a movable tool, an error sensing circuit for monitoring position of the tool including means for emitting a signal in response to deviation of tool position from preselected programmed movement thereof, a pair of voltage sources, means connecting said voltage sources to the armature of said motor in polarity opposed relation, said means comprising a first transistor having its base connected to one side of said error sensing circuit, its collector connected to one side of one of said voltage sources and its emitter connected to one side of said armature, a second transistor of the same polarity as said first transistor having its base connected to the other side of the error sensing circuit, its collector connected to one side of the other voltage source and its emitter connected to the other side of said armature, and one way current conducting means connected between the base and collector leads of each transistor, whereby current will be caused to flow through said armature in response to signal from said error sensing circuit.

4. A motor control circuit comprising a rotationally reversible armature, a first power source connected to one side of said armature, a second power source connected to the other side of said armature in polarity opposed relation, a first pnp transistor having its collector and emitter electrodes connected in series with said armature and first power source, a second pnp transistor having its collector and emitter electrodes connected in series with said armature and second power source, a diode interconnecting the base and emitter leads of each of said transistors and poled to bypass positive current pulses impressed on the respective base leads.

5. The combination set forth in claim 4 including an error sensing circuit connected to the base leads of said respective transistors and operable to impress polarized current pulses on said base leads in response to preselected conditions.

6. In combination with a reversible electrically controlled servo-feed means for controlling the position of a movable tool with respect to a workpiece, an error sensing means for monitoring position of the tool including means for transmitting a signal in response to deviation of tool position from preselected programmed movement thereof, a pair of pnp transistors connected respectively to the signal output leads of said error sensing means, a pair of power sources connected in bucking relationship to said servo-feed means through said respective transistors, whereby conduction through one or the other of said transistors will cause corresponding operation of said servo-feed means and a one way current conducting device connected between the base and emitter leads of each transistor.

References Cited in the file of this patent

UNITED STATES PATENTS

| | | |
|---|---|---|
| 2,813,244 | Guggi | Nov. 12, 1957 |
| 2,875,391 | Brannan | Feb. 24, 1959 |
| 2,875,392 | Pinckaers | Feb. 24, 1959 |